C. S. HAMLIN.
PIPE.
APPLICATION FILED AUG. 22, 1906. RENEWED MAR. 9, 1908.

No. 901,534.

Patented Oct. 20, 1908.

Witnesses
C. C. Holly
J. Townsend

Inventor
Charles S. Hamlin
by James R. Townsend
his Atty

UNITED STATES PATENT OFFICE.

CHARLES S. HAMLIN, OF LOS ANGELES, CALIFORNIA, ASSIGNOR TO E. W. WILSON, OF LOS ANGELES, CALIFORNIA.

PIPE.

No. 901,534.   Specification of Letters Patent.   Patented Oct. 20, 1908.

Application filed August 22, 1906, Serial No. 331,673. Renewed March 9, 1908. Serial No. 420,107.

*To all whom it may concern:*

Be it known that I, CHARLES S. HAMLIN, a citizen of the United States, residing at Los Angeles, in the county of Los Angeles and State of California, have invented a new and useful Pipe, of which the following is a specification.

This invention has relation to pipes and particularly to sheet metal pipes designed for use in conveying hydrocarbons, over extended distances.

One of the objects of this invention is to produce a pipe which by reason of its peculiar manufacture is adapted to withstand the heavy strains of liquids carried therein and furthermore to avoid all leakage by a fault in the seam of the pipe.

A further object of this invention is to render the seam formed on the pipe proof against rust as well as against consequent leakage.

The accompanying drawings illustrate the invention:—

Figure 1:
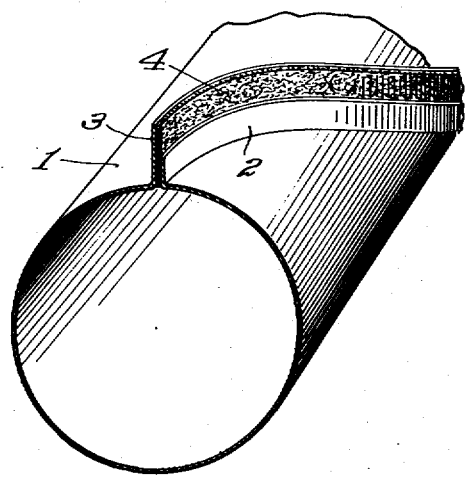
Figure 2:
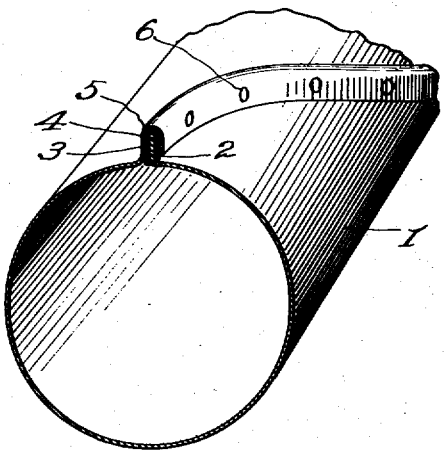
Figure 3:
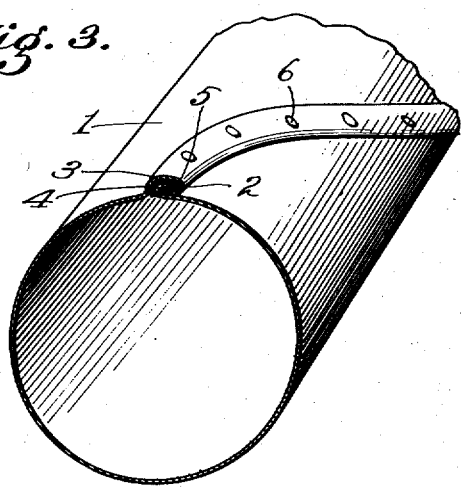
Figure 4:
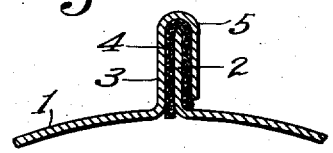
Figure 5:
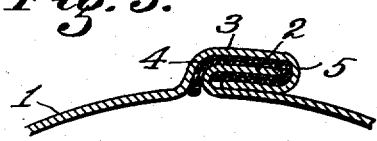

Figure 1 is a perspective of the invention, representing the first step of the manufacture of the pipe with a layer of fire proof material interposed between the upwardly and outwardly extending flanges. Fig. 2 represents a similar view showing the second step in the manufacture of this pipe. Fig. 3 shows the final step. Fig. 4 is an enlarged fragmentary vertical section of the seam. Fig. 5 is a similar view enlarged.

Specific reference being had to the drawings, 1 represents a pipe having formed thereon a flange 2 extending substantially at right angles to the perimeter of the pipe.

3 represents a similar flange considerably larger than the said flange 2, the two being brought into alinement with each other in the course of manufacturing the pipe, the layer being then adapted to overlap the smaller of the flanges 2. Between the two flanges is interposed a fire proof layer 4 of any suitable material preferably asbestos cloth. This layer of asbestos cloth forming a gasket is of approximately the size and dimensions of the larger flange 3, and follows the bend of said flange in the course of overlapping the lower or smaller flange 2.

The process of manufacturing the pipe disclosed in this application consists in bending the respective edges of a strip of metal upon itself to form folds of unequal width, bending said strip helically upon itself whereby the respective folds are brought into alinement; spreading the folds at right angles to the surface of the pipe, causing the engagement of the folds in the presence of heat, riveting said folds, bending the folds upon the exterior surface of the pipe in the presence of heat so that the rivet pins lie wholly exteriorly of the same, and finally dipping the completed pipe in a water-proof material.

In Fig. 2 the layer is seen bent in the form of an inverted U as at 5, snugly fitting the space formed by the overlapping flange 3 and the flange 2, thus forming substantially a unit with the two opposing flanges constituting the seam of the pipe. In the second step of the process, namely that which is indicated in Fig. 2, it will be seen that when the larger of the two flanges is caused to overlap the smaller, the mass of asbestos lying between the two is compressed and made to follow the course of the larger flange, which envelops the smaller and onto which it is riveted, as shown by the rivet pins 6, which pins also serve to hold in place the asbestos layer.

In carrying out the various steps of the process, the direct application of heat is necessary. This necessitates the employment of heat resisting agencies in the seam to forestall any possibility of leakage in the completed pipe, and of course to prevent the diffusion of the interposed layer by reason of the excessive heat upon the flanges in connection with the formation of this seam. For that reason no other than a fire resisting material can be used as a layer between the upturned flanges of the pipe previous to the formation of the completed seam. Furthermore, such material must not comprise material as will be dissolved by the oil traveling through the pipe, but the layer must consist of a medium not only highly resistant to the action of excessive heat and dissolvents, but absolutely immune to them.

The representation in Fig. 3 is of the entire pipe, that is of the final step in the formation of the pipe showing the completed seam with the interposed layer. In this form the layer of heat resisting material completely envelops the flange 2 and is intimately held in contact with the opposing flanges by rivet pins extending through and binding the two together, in other words the two under surfaces, namely, the flange and the asbestos strip encircle the flange 2, the last step of the process where it lies flush upon the periphery of the plate. It is of course obvious that this strip of fire resisting material must be inserted in the second step of the process when the flanges lie parallel with each other, as seen in Fig. 1. This will bring the asbestos strip in the same plane with respect to the lower flange 2 as the larger flange 3, whereby in the course of completing the seam the layer, being of the same length as the larger flange, retains its length and consequently forms a perfectly tight and seamless joint. The pipe in its completed form is therefore provided with a seam which lies wholly exteriorly of the pipe, which seam is likewise riveted, the rivet pins also being on the outside of the pipe and not piercing the walls of the same.

What I claim is:—

1. As a new article of manufacture, a pipe composed of a strip of wound metal provided with curved edges which respectively interlock, said curved edges having interposed an asbestos lining, the interlocking edges with the interposed lining being riveted together, the rivets lying wholly exteriorly of the pipe.

2. As a new article of manufacture, a pipe composed of a convoluted strip of sheet metal provided with curved edges which respectively interlock and lie upon the surface of the pipe, the curved edges having interposed a liquid-proof packing, the interlocking edges being riveted, the rivets lying exteriorly of the pipe and upon the outer periphery of the same.

3. As a new article of manufacture, a pipe composed of a strip of metal provided with curved edges which respectively interlock and lie upon the surface of the pipe, the curved edges having interposed an asbestos strip, and the curved edges being riveted, the rivet pins extending solely through the interlocked edges without piercing the pipe.

4. As a new article of manufacture, a pipe composed of a strip of metal coiled upon and away from itself and having its edges curved, which edges lie in proximate relative alinement and are of unequal sizes, the greater of which is arranged to overlap and interlock with the smaller, an asbestos lining interposed between said interlocked edges, and rivet pins extending through the interlocked edges and the lining, the rivet pins lying wholly exteriorly of the pipe.

5. As a new article of manufacture, a pipe composed of a convoluted strip of sheet-metal provided with reversely-curved edges which interlock and lie in proximity to the surface of the pipe, the interlocking edges alone being riveted and extending wholly exteriorly of the pipe whereby the bore of the same is always free.

6. As a new article of manufacture, a pipe composed of a strip of metal wound to form a helix and provided on one side with an edge which is curved away from the cylindrical surface of the body, the terminus of the edge being curved upon itself, and on the other side with an edge curved upwardly and upon itself, said edge being arranged to interlock with the first-named edge and lie upon the surface of the pipe, the interlocked edges having rivets passing through the same, which do not pierce the wall of the pipe but lie wholly exterior thereto.

7. As a new article of manufacture, a pipe composed of a strip of metal wound to form a helix and provided with curved edges which interlock and lie upon the surface of the pipe, the interlocked edges having rivet-pins extending through the same, the seam thus formed lying wholly upon the exterior surface of the pipe, and the rivets lying against the exterior surface of the pipe without piercing the wall of the same.

8. As a new article of manufacture, a pipe composed of a strip of metal coiled upon and away from itself, and having curved edges of unequal length in approximate relative alinement, the greater of which overlaps and interlocks with the smaller, and having rivet-pins extending through the interlocked edges, the rivets in the interlocked edges lying wholly exterior of and upon the surface of the pipe.

In testimony whereof, I have hereunto set my hand at Los Angeles California this 15th day of August 1906.

CHARLES S. HAMLIN.

In presence of—
ANTON GLOETZNER,
JULIA TOWNSEND.